United States Patent
Gross et al.

(10) Patent No.: US 8,966,581 B1
(45) Date of Patent: Feb. 24, 2015

(54) DECRYPTING AN ENCRYPTED VIRTUAL MACHINE USING ASYMMETRIC KEY ENCRYPTION

(75) Inventors: Adam Gregory Gross, Los Gatos, CA (US); Christian Matthew Leroy, San Francisco, CA (US); Jonathan Langmaid, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 308 days.

(21) Appl. No.: 13/082,326

(22) Filed: Apr. 7, 2011

(51) Int. Cl.
*H04L 29/06* (2006.01)
*G06F 21/33* (2013.01)

(52) U.S. Cl.
CPC ............ *H04L 63/0823* (2013.01); *G06F 21/33* (2013.01)
USPC ........................................ 726/2; 726/4; 726/5

(58) Field of Classification Search
USPC .......................................... 713/182; 726/4–5
See application file for complete search history.

(56) References Cited

U.S. PATENT DOCUMENTS

| | | | |
|---|---|---|---|
| 2006/0200854 A1* | 9/2006 | Saito .................................. | 726/2 |
| 2006/0210031 A1* | 9/2006 | Picard et al. ............... | 379/88.18 |
| 2007/0204166 A1* | 8/2007 | Tome et al. ................... | 713/182 |
| 2008/0244569 A1* | 10/2008 | Challener et al. ................. | 718/1 |
| 2009/0094673 A1* | 4/2009 | Seguin et al. ..................... | 726/1 |
| 2009/0193249 A1* | 7/2009 | Conrado et al. .............. | 713/156 |
| 2009/0216975 A1 | 8/2009 | Halperin et al. | |
| 2009/0276626 A1* | 11/2009 | Lazaridis et al. ............. | 713/168 |
| 2009/0282266 A1* | 11/2009 | Fries et al. ..................... | 713/193 |
| 2010/0070870 A1 | 3/2010 | Halperin et al. | |
| 2010/0088507 A1* | 4/2010 | Cho ............................ | 713/156 |
| 2011/0302400 A1* | 12/2011 | Maino et al. ...................... | 713/2 |

\* cited by examiner

*Primary Examiner* — Edward Zee
*Assistant Examiner* — Chi Nguy (57) ABSTRACT

Authenticating a user to access a virtual machine (VM) stored on a client computing device includes receiving user authentication credentials associated with a certificate, such as a PIN associated with a certificate housed on a smart card. The certificate is associated with a public key and a private key. The technique includes encrypting the VM to be decrypted with an unlock code, and generating a challenge string by encrypting the unlock code using the public key associated with the certificate. The challenge string is a result of encrypting of the unlock code, and the unlock code can be obtained by decrypting the challenge string using the private key. The technique further includes decrypting the challenge string using the private key to retrieve an unlock code associated with the VM, decrypting the VM with the unlock code, and causing the decrypted VM to be executed on the client computing device.

12 Claims, 5 Drawing Sheets

DECRYPTING AN ENCRYPTED VIRTUAL MACHINE USING ASYMMETRIC KEY ENCRYPTION

BACKGROUND

Computer virtualization is a technique that involves abstracting a physical computing machine platform into a virtual machine that is executed under the control of virtualization software running on a single hardware computing platform (also referred to herein as "host system" or "host computer"). A group of hardware computing platforms may be organized as a cluster to provide the hardware resources for virtual machines. In a server or data center that employs virtual machines, it is common to see hundreds, even thousands, of virtual machines running on multiple clusters of host systems.

When a user wishes to access a virtual machine executing on a server, the user is typically required to authenticate with the server. Modern computing systems provide various methods for user authentication. One common authentication technique employs a username and password, where the user enters his or her user identifier and a secret password that only the user knows. The username and password, or a representation thereof, are transmitted over a computing network from a user-side client device to the server. The server checks whether the username and password are valid before giving the user access to the virtual machine.

In addition to network-based computer virtualization, modern virtualization techniques allow users to execute virtual machines locally on the user-side client device. For example, the VMware® View™ desktop virtualization software includes a "Local Mode" that allows a user to "check out" a virtual machine from the server onto the user-side client device for local execution. Since the checked-out virtual machine can be executed locally on the user-side client device, the user is able to access all the files and application of the virtual machine, even in the absence of a network connection to the server.

SUMMARY

One or more embodiments provide for user authentication techniques that employ encryption technology. In particular, embodiments are directed to decrypting an encrypted virtual machine using asymmetric key encryption. When a user initiates the process of "checking out" a virtual machine from a server to the user's local machine, the server encrypts the virtual machine and encrypts the virtual machine's unlock code using a public key associated with a certificate stored on the user's local machine or a smart card. For example, the certificate may be associated with a smart card inserted into a smart card reader coupled to the user's local machine and may include a public key and a private key. Encrypting the virtual machine's unlock code with the public key generates a challenge string. The encrypted virtual machine and the challenge string are transmitted to the user's local machine for storage. At a later time, when the user wishes to access the locally-stored virtual machine, the user is prompted to enter a PIN associated with the smart card. If the correct PIN is entered and the correct certificate is used, the challenge string is decrypted using the private key associated with the certificate. Decrypting the challenge string with the private key generates the unlock code for the encrypted virtual machine. The unlock code is then used to decrypt the virtual machine and allow the user access to the locally-stored virtual machine. By providing these features, the technique according to one or more embodiments provide secure user authentication for a locally stored and executed virtual machine.

One embodiment provides a method for authenticating a user to access a virtual machine stored on a client computing device, the virtual machine being encrypted using an unlock code. The method includes receiving user authentication credentials associated with a certificate, the certificate being associated with a public key and a private key. The method further includes decrypting a challenge string using the private key associated with the certificate to retrieve an unlock code associated with the virtual machine; decrypting the virtual machine using the unlock code as a decryption key; and executing the decrypted virtual machine on the client computing device.

Another embodiment provides a method for encrypting a virtual machine to be executed on a client computing device. The method includes retrieving a public key associated with a certificate used to authenticate a user, wherein the certificate is further associated with a private key; encrypting the virtual machine so that the virtual machine can be decrypted with an unlock code; and generating a challenge string by encrypting the unlock code using the public key associated with the certificate, the challenge string being a result of the encrypting of the unlock code, where the unlock code can be obtained by decrypting the challenge string using the private key associated with the certificate.

DETAILED DESCRIPTION

Figure 1A:
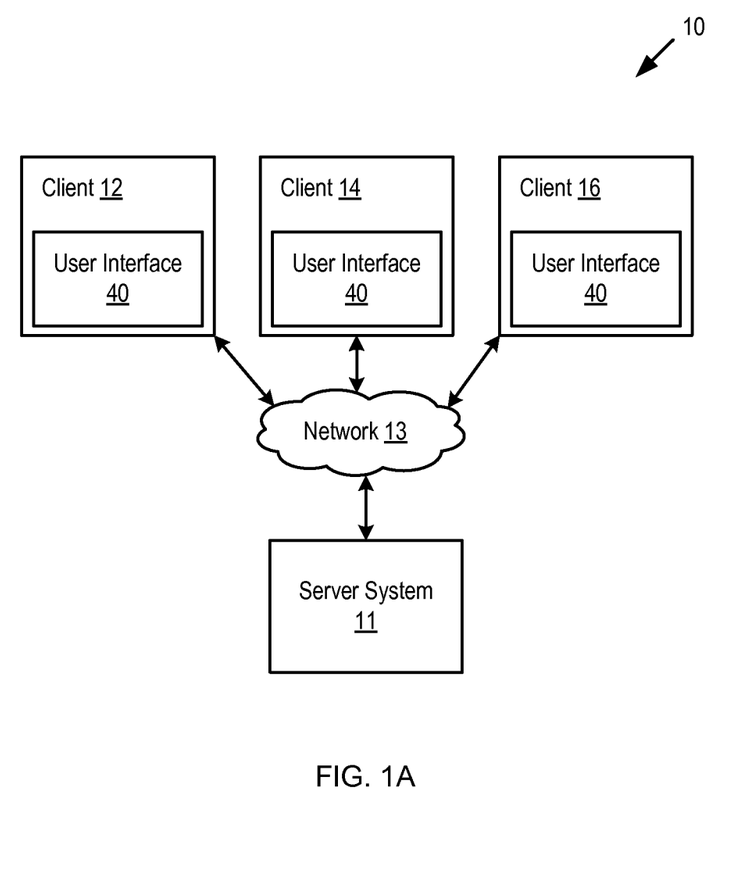
FIG. 1A illustrates a virtual desktop infrastructure (VDI) system in which one or more embodiments of the invention may be practiced.

FIG. 1A illustrates a virtual desktop infrastructure (VDI) system 10 in which one or more embodiments of the invention may be practiced. The term, "desktop" refers to a human interface environment through which users can launch, interact with, and manage the user's applications, settings, and data. Traditionally, a desktop is presented by an operating system on a video display, and a user interacts with the desktop using a mouse and keyboard. Applications, documents, and other files may be displayed on the desktop and user input can be received by applications visible to the user on the display. The term "desktop" is also known to be used to refer to a physical computer system or "physical desktop" that might be placed on or near a user's desk, which is distinct from a "laptop" or "palmtop," but as used herein, the term "desktop" by itself refers to the human interface environment described above, and not a physical computer system. Using computer virtualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop," therefore, is no longer tied to a particular physical computer system.

VDI system 10 includes VDI server system 11 in data communication over network 13 with several VDI client systems 12, 14, and 16. Network 13 may be any configuration, such as a local area network (LAN), or private or publicly accessible wide area network (WAN), such as the Internet. It should be recognized that FIG. 1A shows a simplified representation of a typical VDI network server system 11, which may include other components such as firewalls, connection brokers, and load balancers, as well as back-end storage networks, database servers, among others, as described in greater detail in FIG. 1B. Each client system 12, 14, 16 may include a user interface 40 through which a user can interact with his or her desktop.

Figure 1B:
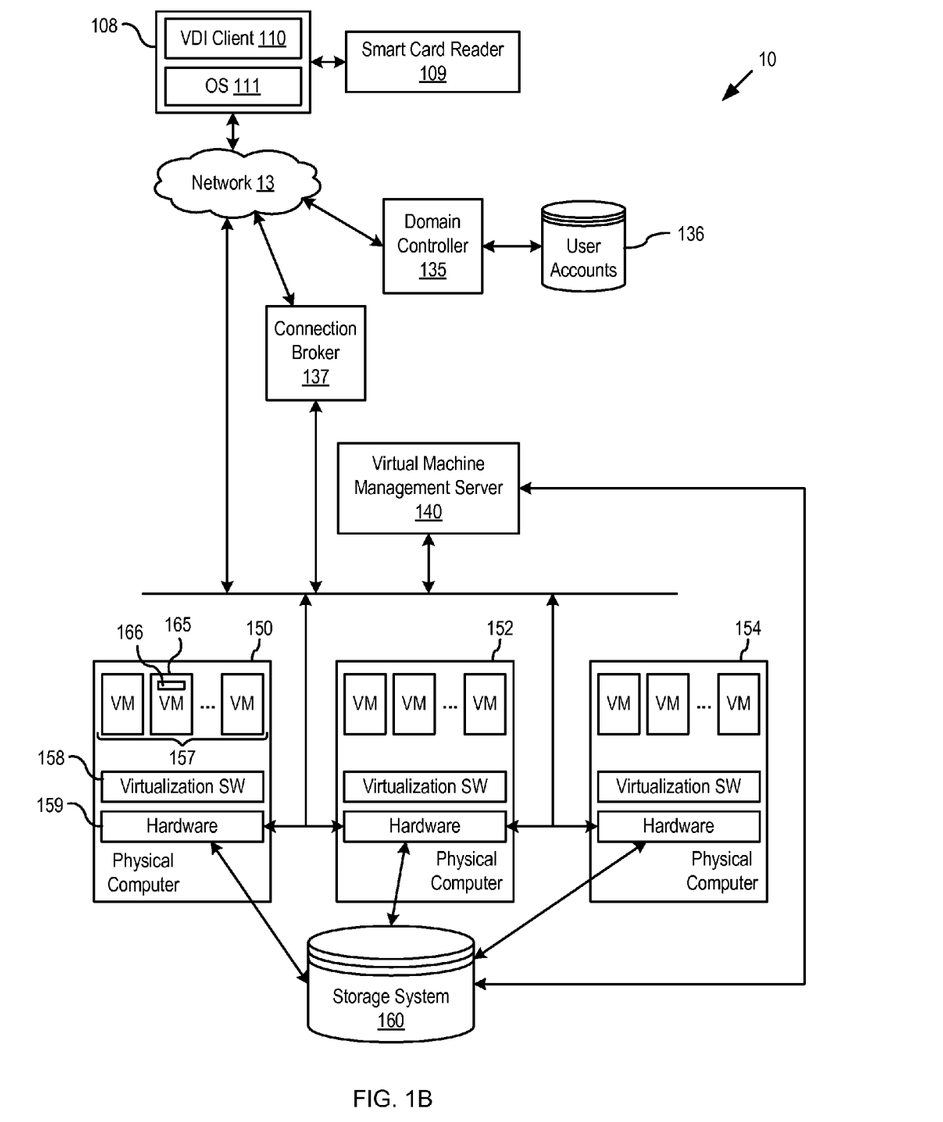
FIG. 1B illustrates components of the VDI system, according to one embodiment of the invention.

FIG. 1B illustrates components of the VDI system 10, according to one embodiment of the invention. In VDI system 10, VDI client software programs (also referred to as "VDI clients" for short), e.g., VDI client 110, run on operating systems of local computing devices, e.g., operating system (OS) 111 executing on client machine 108. VDI clients provide an interface for the users to access their desktops, which may be running in one of virtual machines 157 or blade server (not shown) in a data center that is remote from the user location. As described, the term, "desktop" refers to the instance of an interactive operating environment provided by a computer operating system and software applications, typically in the form of a display and sound output and keyboard and mouse input. With VDI clients, users can access desktops running in a remote data center through network 13, from any location, using a general purpose computer running a commodity operating system and a VDI client software program such as VMware® View™, or a special purpose thin client such as those available from Dell, HP, NEC, Sun Microsystems, Wyse, and others.

In one embodiment, VDI system 10 includes a domain controller 135, such as Microsoft® Active Directory®, that manages user accounts including user log-in information stored in a user accounts database 136, and a connection broker 137 that manages connections between VDI clients and desktops running in virtual machines 157 or other platforms. Domain controller 135 and connection broker 137 may run on separate servers or in separate virtual machines running on the same server or different servers. In the embodiments illustrated herein, desktops are running in virtual machines 157 and virtual machines 157 are instantiated on a plurality of physical computers 150, 152, 154, each of which includes virtualization software 158 and hardware 159, is controlled by a virtual machine management server 140, and is coupled to a shared persistent storage system 160.

The components of VDI system 10 communicate via network 13. For simplicity, a single network is shown but it should be recognized that, in actual implementations, the components of VDI system 10 may be connected over the same network or different networks. Furthermore, a particular configuration of the virtualized desktop infrastructure is described above and illustrated in FIG. 1B, but it should be recognized that one or more embodiments may be practiced with other configurations of the virtualized desktop infrastructure.

In one embodiment, user credentials that are used for logging in to a VM include a user principal name on a smart card certificate and a smart card PIN when using smart card authentication. In the embodiment shown, a smart card reader 109 is connected to client machine 108, and when the user connects to connection broker 137 using VDI client 110, a user interface for inputting a smart card PIN is displayed to the user. Client machine 108 gains access to the private data of the certificates stored in the smart card only when the correct smart card PIN is entered by the user. As described in greater detail herein, a certificate can include a private key and a public key. In some embodiments, in order for the user to perform operations using the private key, the user is required to enter the smart card PIN for authentication. In some embodiments, the public key associated with the certificate is transmitted over the network when the user authenticates with the server. For example, the public key associated with the certificate can be stored in the user accounts database 136.

Figure 1C:
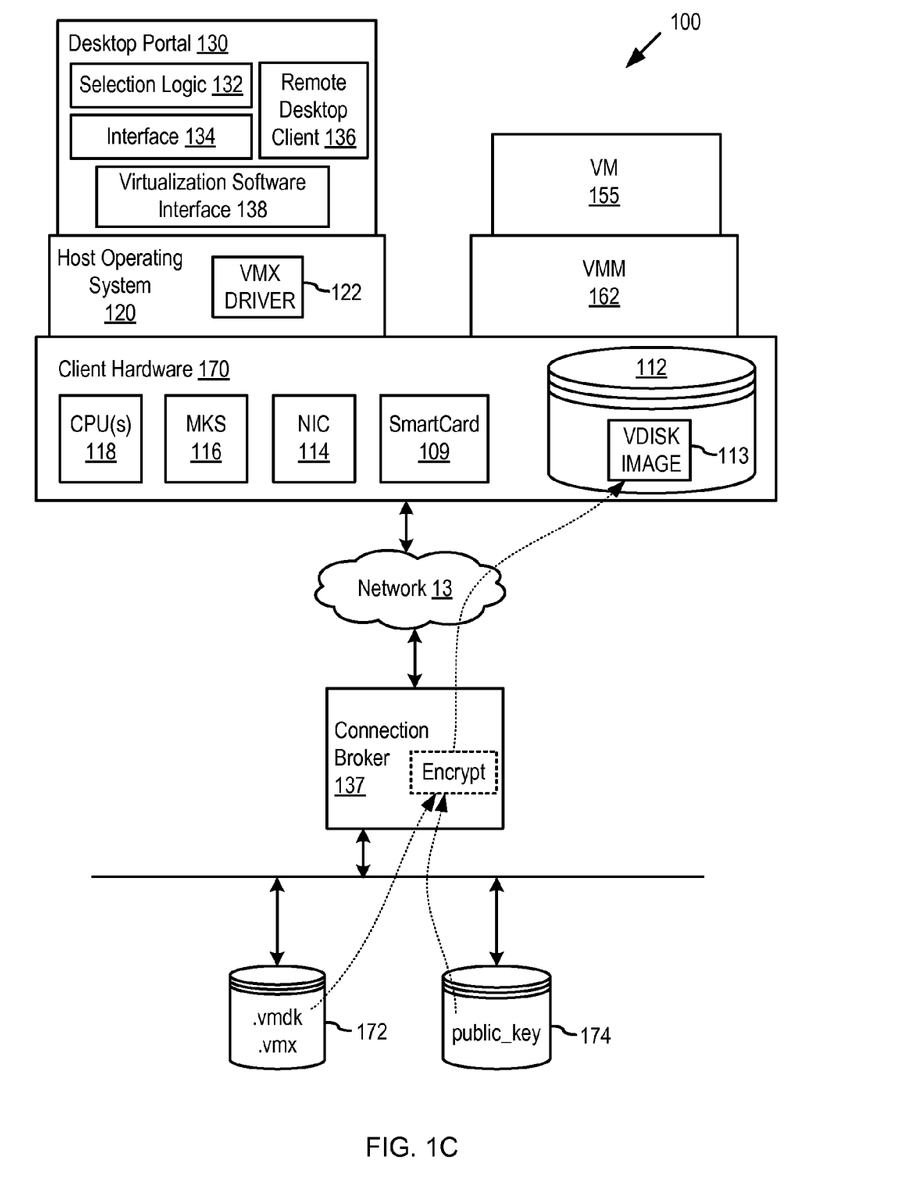
FIG. 1C illustrates a system that allows the user to cause a VM to be transferred to the user's local machine for local execution of the VM, according to one embodiment of the invention.

FIG. 1C illustrates a system 100 that allows the user to cause a VM to be transferred to the user's local machine for local execution of the VM, according to one embodiment of the invention. The system 100 allows a user to access a copy of a particular VM, regardless of whether the copy of the VM is executing locally or remotely, using just one program and graphical user interface, the program being referred to herein as a desktop portal. However, one issue encountered by local execution of virtual machines is user authentication. In some cases, the user-side client device may not have a network connection to the server that would typically perform user authentication in a standard server-based virtualization environment. Accordingly, embodiments provide secure user authentication of a locally stored and executed virtual machine. System 100 comprises client hardware 170, which may be a general purpose computer system such as a workstation, laptop, etc., for use by the user. In one embodiment, hardware 170 includes one or more processors (CPUs) 118, mouse, keyboard, and screen interfaces (MKS) 116, network interface card (NIC) 114, disk 112 for non-volatile data storage, and a smart card reader 109. Disk 112 may be implemented using traditional rotating media or using a solid state technology. Client hardware 170 is in electronic communication with connection broker 137, which is in communication with datastores 172, 174. The connection broker 137 is also in communication with one more remote servers (not shown) that support execution of one or more VMs, as shown in FIG. 1B.

A host operating system 120 runs at the system level on client hardware 170. Host operating system 120 may be an embedded operating system or a commodity operating system such as Microsoft® Windows®. The host operating system 120 manages the system resources of client hardware 170, e.g., CPU(s) 118, random access memory (not shown), disk 112, etc. Also running at system level is virtual machine monitor (VMM) 162, which supports VM 155. VMM 162 is in communication with VMX driver 122, which coordinates context changes between VMM 162 execution and host OS 120 execution, and allows host OS 120 to manage system resources for both applications running directly on host OS 120 as well as VMM 162, and by extension VM 155. In other embodiments, virtualization software can run on top of the host OS 120, instead of independently.

In some embodiments, a user can "check out" a virtual machine (VM) from a remote server to the client hardware 170. When a remote copy of the VM is executing on the remote server, the user can access the remote copy of the VM using a remote desktop display protocol such as RDP, PCoIP (PC-over-IP), etc. Once the VM is checked out from the remote server, a copy is created on the user's local machine for use with virtualization software. Host operating system 120 provides an execution environment for applications designed to run thereon. Among these applications is desktop portal 130, which provides a single point of entry by the user to interact with his or her VM regardless as to whether it is a local copy of VM 155 or a remote copy of VM. Desktop portal 130 includes several components, including selection logic 132, user interface 134, remote desktop client 136, and virtualization software interface 138.

Selection logic 132 receives log-in information from the user (e.g., via interface 134) and accesses location information of the user's VM. Selection logic 132 can implement or initiate VM check-in and check-out operations, and allows the user to select which copy of the VM to access. In alternate embodiments, selection logic 132, based on configurable rules, automatically selects an appropriate copy of the VM for the user.

The location information may be maintained locally by selection logic 132. Alternatively, or in addition thereto, the location information may be hosted by connection broker 137 or a database accessible by connection broker 137. Location information can also be hosted in some other location accessible by one or both client hardware 170 and connection broker 137, e.g., using a discovery service. For example, if the VM had most recently been checked out, then the locally-maintained location information will indicate that the user's VM is available locally. The user may then be given an option to check the VM back in, i.e., upload the changed portion of the VM to remote server(s), or begin working on the local copy of the VM. On the other hand, if the VM has most recently been checked in, then the location information will indicate that the VM is available remotely.

If the user accesses a local copy of the VM, then the selection logic invokes virtualization software interface 138 to interact with local copy of VM 155. On the other hand, if the user accesses a remote copy of the VM, then selection logic invokes desktop client 136 to connect to and interact with remote copy of the VM. Regardless which copy of the user's VM the user connects to, desktop portal 130 may provide a unified interface for a common user experience.

VM information, which may include any one or more of configuration and policy information as well as one or more virtual disk images (VDISK image) 113, may be maintained on disk 112 in an encrypted format accessible by desktop portal 130, as described in greater detail herein. Accordingly, policy and configuration settings are not directly accessible to the user and virtual disk contents cannot be tampered with by the user or a third party. This provides a secure encapsulation of a user's desktop resources suitable for enterprise users who require anytime and anywhere access to their desktop without sacrificing centralized control. Furthermore, if client hardware 170 is a laptop, the data cannot be accessed if stolen by a third party due to local encryption and log-in requirements at the desktop portal level.

In one embodiment, datastore 172 stores a disk image file and configuration file for a VM. The disk image file, for example, can be a .vmdk file. The configuration file, for example, can be a .vmx file. Datastore 174 stores a public key associated with the certificate used to authenticate the user during log on to the VM. When the user checks out a VM from the server to the user's local machine, connection broker 137 encrypts the disk image file and the configuration file associated with the VM. The encrypted VM can be decrypted with an unlock code. In one embodiment, the connection broker encrypts the unlock code with the public key associated with the certificate to generate a challenge string. The challenge string is transmitted to the client hardware 170 with the encrypted VM for storage in the disk 112. In another embodiment, the public key associated with the certificate is stored in a memory unit included in the connection broker 137, and datastore 174 is omitted from the system 100.

At a later time, the user can attempt to authenticate and access the locally stored VM. The user is prompted to enter a PIN associated with the certificate previously used to authenticate with the server. If a correct PIN is entered, then the desktop portal 130, or some other entity, such as the smart card (not shown) acting on the behalf of desktop portal 130, decrypts the challenge string using the private key associated with the certificate. Decrypting the challenge string returns the unlock code for decrypting the VM. The unlock code can then be used to decrypt the VM and provide the user access to the VM.

If either of the two decryption steps fails (i.e., decrypting the challenge string into the unlock code, or decrypting the encrypted VM with the unlock code), then a different certificate is being used to attempt authentication than was used when the user originally authenticated with the connection broker 137 at the time of check out of the VM or the incorrect PIN was presented to desktop portal 130, and the user would be denied access to the VM.

Figure 2:
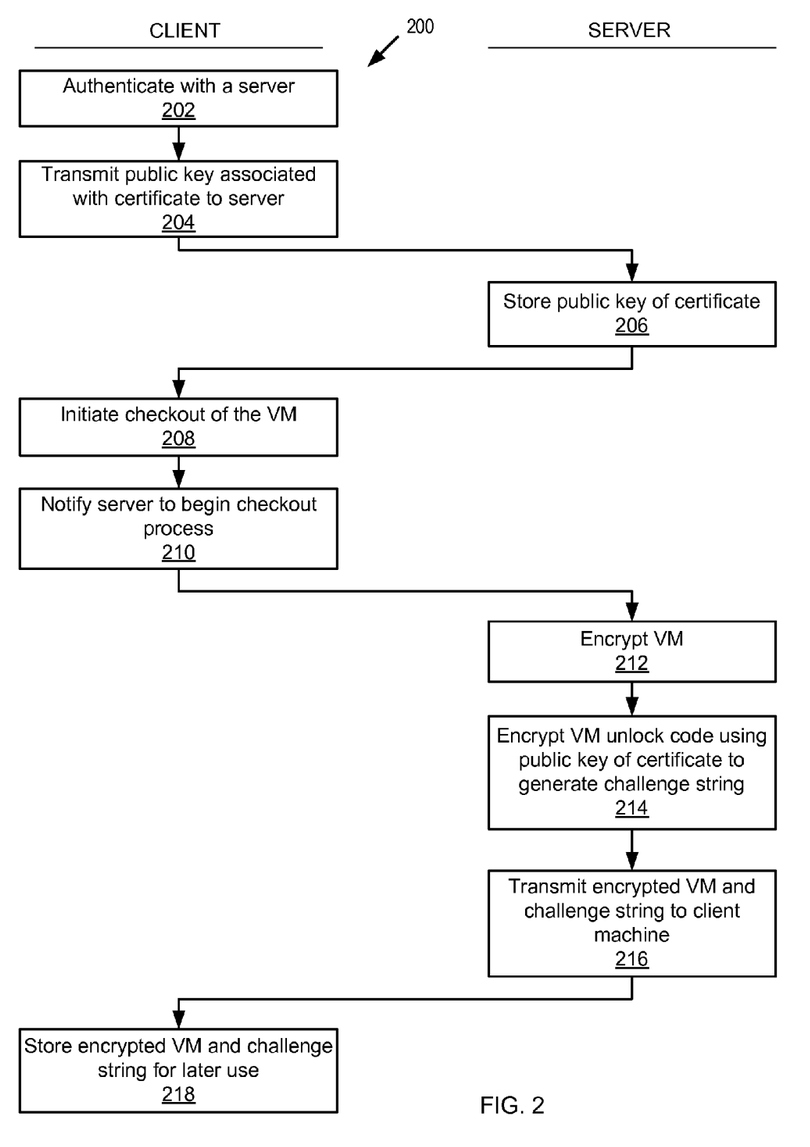
FIG. 2 is a flow diagram of method steps for generating a challenge string based on an unlock code associated with a VM and public key associated with a certificate, according to one embodiment of the invention.

FIG. 2 is a flow diagram of method steps for generating a challenge string based on an unlock code associated with a VM and public key associated with a certificate, according to one embodiment of the invention. It should be understood that, even though the method 200 is described in conjunction with the systems of FIGS. 1A-1C, any system may be configured to perform the method steps, in any suitable order.

As shown, the method 200 begins at step 202, where a client machine, such as client hardware 170, authenticates with a server. In some embodiments, authentication requires the user to enter an appropriate username and password. In other embodiments, authentication requires the user to enter a PIN associated with a certificate stored on the client machine. For example, the certificate can be stored in a smart card coupled to the client machine. In another example, the certificate can be directly stored on the client machine and is not associated with a smart card. At step 204, the client machine transmits a public key associated with the certificate to the server. As described, a certificate includes a public key and a private key.

At step 206, the server stores the public key in a database. In one embodiment, the public key is stored in the datastore 174 shown in FIG. 1C. After the user has properly authenticated, at a later point in time, at step 208, the user initiates a check out of a VM to the client machine. At step 210, the client machine transmits a notification the server to begin the check out process.

In response to the notification to begin the check out process, at step 212, the server encrypts the virtual machine using an "unlock code" as the encryption key. In one embodiment, the VM can be decrypted by providing the unlock code associated with the VM. For example, the unlock code can be an alphanumeric character string. At step 214, the server encrypts the VM's unlock code using the public key of the certificate used during authentication to generate a challenge string. At step 216, the server transmits the encrypted VM and the challenge string to the client machine. At step 218, the client machine stores the encrypted virtual machine and the challenge string in a storage unit associated with the client machine.

In one embodiment, the connection broker 137, included in the server, performs the steps 206, 212, 214, 216 of the method 200.

Figure 3:
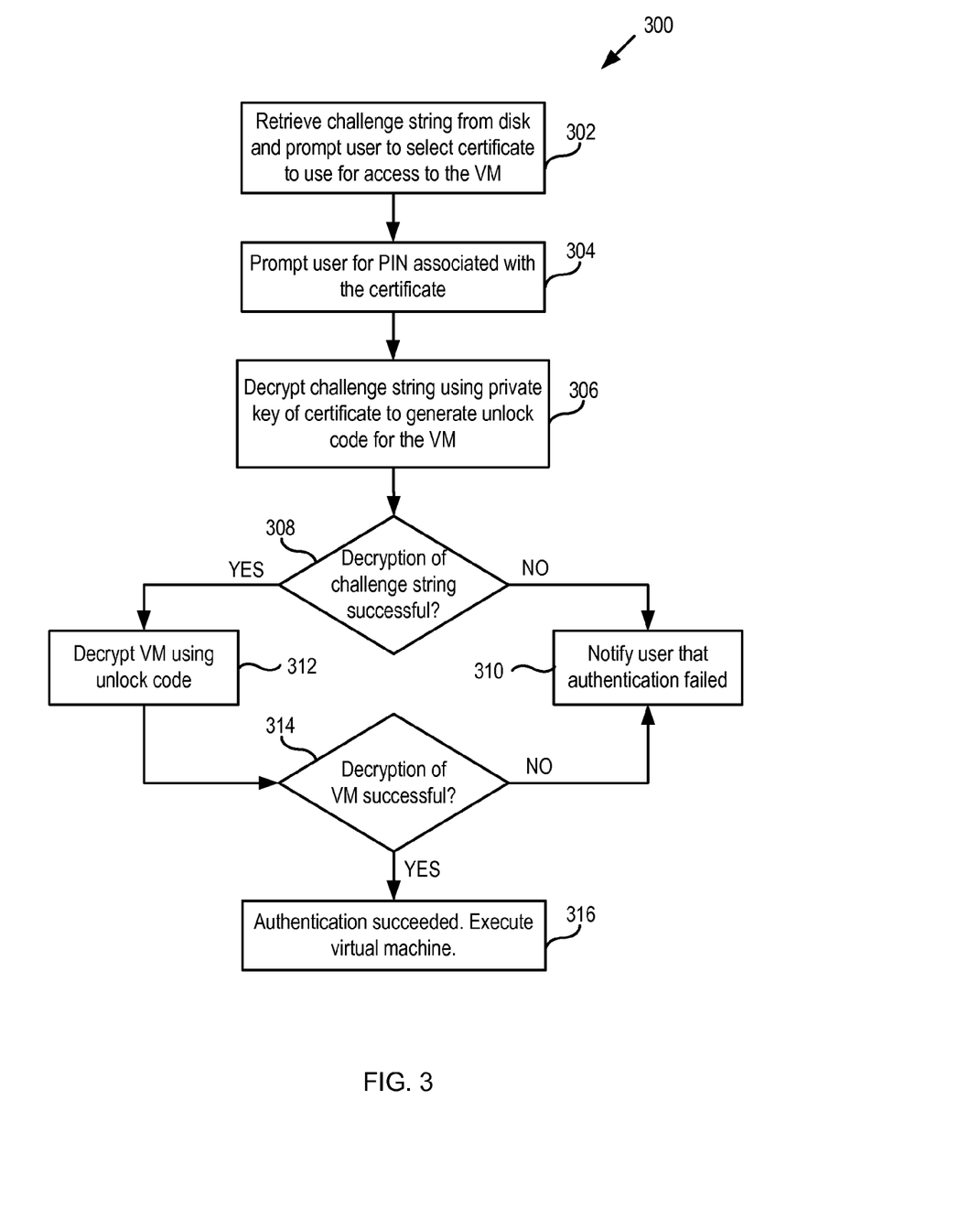
FIG. 3 is a flow diagram of method steps for decrypting a virtual machine based on a challenge string and a private key associated with a certificate, according to one embodiment of the invention.

FIG. 3 is a flow diagram of method steps for decrypting a virtual machine based on a challenge string and a private key associated with a certificate, according to one embodiment of the invention. It should be understood that, even though the method 300 is described in conjunction with the systems of FIGS. 1A-1C, any system may be configured to perform the method steps, in any suitable order.

As shown, the method 300 begins at step 302, where a desktop portal executing on the client machine retrieves a challenge string from a storage unit and prompts the user to select a certificate to use when attempting to access a locally-stored and encrypted VM. In some embodiments, only one certificate is associated with the client machine, so the certificate is automatically selected by the desktop portal without explicit selection by the user. In other embodiments, the desktop portal can use one or more heuristics to automatically select one of a plurality of certifications associated with the client machine without explicit selection by the user. In other embodiments, the desktop portal prompts the user to select a certificate to use for authentication. As described, the one or more certificates can be stored on a smart card associated with the client machine or stored directly on the client machine.

After the appropriate certificate is selected, at step 304, the desktop portal prompts the user to enter a PIN associated with the certificate to allow access to the certificate's private key. Although the user and/or local machine may not have direct access to the private key itself, the desktop portal, or some entity acting on behalf of the desktop portal, such as the smart card itself (not shown) can perform operations using the private key if proper authentication is received. In one embodiment, proper authentication is received by the user entering a correct PIN associated with the certificate. In other embodiments, authentication can be performed using biometric or other authentication techniques.

At step 306, the desktop portal, or some entity such as the smart card (not shown) acting on behalf of the desktop portal, decrypts the challenge string using the certificate's private key to generate an unlock code for the locally-stored and encrypted VM. If another entity performs the decryption of the challenge string, then the unlock code resulting from the decryption of the challenge string is provided to the desktop portal. At step 308, the desktop portal determines whether the decryption of the challenge string was successful. Determining whether decryption of the challenge string is successful, in some embodiments, is based on whether the decrypted result satisfies certain expected characteristics. If the desktop portal determines that the decryption of the challenge string was not successful, then the method 300 proceeds to step 310, where the desktop portal notifies the user that authentication has failed. The user, therefore, is denied access to the VM.

If at step 308 the desktop portal, or some entity such as the smart card (not shown) acting on behalf of the desktop portal, determines that the decryption of the challenge string was successful, then the method 300 proceeds to step 312, where the desktop portal decrypts the virtual machine using the unlock code. At step 314, the desktop portal determines whether the decryption of the virtual machine was successful. If the desktop portal determines that the decryption of the virtual machine was not successful, then the method 300 proceeds to step 310, where the desktop portal notifies the user that authentication has failed and the user is denied access to the VM. More specifically, in the rare case where the incorrect private key is used to decrypt the challenge string results in a properly formed, but invalid unlock code, the VM will still not be decrypted properly and the user is denied access.

If, however, desktop portal determines that the decryption of the virtual machine was successful, then the method 300 proceeds to step 316, where authentication is successful, and the desktop portal allows the virtual machine to be executed locally.

Embodiments provide a more robust authentication technique when compared to, for example, username and password authentication of locally-stored VMs. In a username/password technique, if the password is changed after the VM has been checked out to the local machine, then the new password would not work to access the locally-stored VM. The user would need to continue to use the old password, which may be no longer known, to access the locally-stored VM. In contrast, using techniques described herein, if the PIN associated with the certificate is changed after the VM has been checked out to the local machine, the new PIN is used to access the locally-stored VM and the old PIN would not work. In this manner, a more transparent and robust authentication technique is provided by embodiments described herein.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of embodiments of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for authenticating a user to access a virtual machine stored on a remote server, the method comprising:
   receiving a request from the user to access the virtual machine from the remote server;
   determining that the virtual machine is also stored locally on a computing device of the user;
   accessing the locally stored virtual machine;
   once the virtual machine has been accessed, receiving a challenge string created by encrypting an unlock code associated with the virtual machine using a public key associated with a certificate;
   prompting the user to select a certificate from a plurality of certificates associated with the client computing device to use for authenticating access to the virtual machine;
   receiving, from the user, a selected certificate from the plurality of certificates, the selected certificate corresponding to the certificate associated with the public key;
   decrypting the challenge string using the private key associated with the selected certificate to retrieve the unlock code associated with the virtual machine;
   decrypting the virtual machine using the unlock code as a decryption key; and
   executing the decrypted virtual machine on the computing device.

2. The method of claim 1, wherein the certificate is stored in a memory unit included in the computing device and is not stored on a smart card.

3. A method for encrypting and decrypting a virtual machine to be executed on a client computing device, the method comprising:
   receiving a request from a user to access the virtual machine stored on a remote server;
   accessing the virtual machine from the remote server;
   receiving, from the user, a PIN associated with a certificate, the PIN enabling access to a public key associated with the certificate;
   retrieving the public key associated with the certificate;
   encrypting the virtual machine with an unlock code so that the virtual machine can be decrypted with the unlock code;
   generating a challenge string by encrypting the unlock code using the public key associated with the certificate, the challenge string being a result of the encrypting of the unlock code;
   storing the encrypted virtual machine and the challenge strings on the client computing device;
   changing the PIN associated with the certificate from a first value to a second value after the virtual machine has been stored on the client computing device;
   receiving user authentication credentials that include the second value of the PIN to access the virtual machine stored on the client computing device, the user authentication credentials enabling access to a private key associated with the certificate;
   decrypting the challenge string using the private key associated with the certificate to retrieve the unlock code associated with the virtual machine;
   decrypting the virtual machine using the unlock code as a decryption key;
   executing the decrypted virtual machine on the client computing device;
   receiving a second request from the user to access the virtual machine from the remote server;
   determining that the virtual machine is currently stored on client computing device;
   based on the second request, accessing the virtual machine from the client computing device without accessing the virtual machine from the remote server; and
   executing the virtual machine on the client computing device.

4. The method of claim 3, wherein the encrypting of the virtual machine includes encrypting one or more disk image files and one or more configuration files associated with the virtual machine.

5. The method of claim 3, further comprising receiving a notification from the client computing device that the user has initiated a checkout of the VM to the client computing device, the operations of the retrieving of the public key, the encrypting of the virtual machine, and the generating of the challenge string being performed in response to the receiving of the notification.

6. The method of claim 3, further comprising storing the public key associated with the certificate in a memory after the user is authenticated using the certificate associated with the public key.

7. A non-transitory computer-readable storage medium comprising instructions that, when executed in a computing device, enable a technique for authenticating a user to a virtual machine stored on a remote server by performing the steps of:
   receiving a request from the user to access the virtual machine from the remote server;
   determining that the virtual machine is also stored locally on a computing device of the user;

accessing the locally stored virtual machine;
receiving a challenge string created by encrypting an unlock code associated with the virtual machine using a public key associated with a certificate;
prompting the user to select a certificate from a plurality of certificates associated with the client computing device to use for authenticating access to the virtual machine;
receiving, from the user, a selected certificate from the plurality of certificates, the selected certificate corresponding to the certificate associated with the public key;
decrypting the challenge string using the private key associated with the selected certificate to retrieve the unlock code associated with the virtual machine;
decrypting the virtual machine using the unlock code as a decryption key; and
executing the decrypted virtual machine on the client computing device.

8. The computer-readable storage medium of claim 7, wherein the certificate is stored in a memory unit included in the client computing device and is not stored on a smart card.

9. A non-transitory computer-readable storage medium comprising instructions that, when executed in a computing device, enable a technique for encrypting and decrypting a virtual machine to be executed on a client computing device, by performing the steps of:
receiving a request from a user to access the virtual machine stored on a remote server;
accessing the virtual machine from the remote server;
receiving, from the user, a PIN associated with a certificate, the PIN enabling access to a public key associated with the certificate;
retrieving the public key associated with the certificate;
encrypting the virtual machine with an unlock code so that the virtual machine can be decrypted with the unlock code;
generating a challenge string by encrypting the unlock code using the public key associated with the certificate, the challenge string being a result of the encrypting of the unlock code;
storing the encrypted virtual machine and the challenge string on the client computing device;
changing the PIN associated with the certificate from a first value to a second value after the virtual machine has been stored on the client computing device;
receiving user authentication credentials that include the second value of the PIN to access the virtual machine stored on the client computing device, the user authentication credentials enabling access to a private key associated with the certificate;
decrypting the challenge string using the private key associated with the certificate to retrieve the unlock code associated with the virtual machine;
decrypting the virtual machine using the unlock code as a decryption key;
executing the decrypted virtual machine on the client computing device;
receiving a second request from the user to access the virtual machine from the remote server;
determining that the virtual machine is currently stored on client computing device;
based on the second request, accessing the virtual machine from the client computing device without accessing the virtual machine from the remote server; and
executing the virtual machine on the client computing device.

10. The computer-readable storage medium of claim 9, wherein the encrypting of the virtual machine includes encrypting one or more disk image files and one or more configuration files associated with the virtual machine.

11. The computer-readable storage medium of claim 9, further comprising receiving a notification from the client computing device that the user has initiated a checkout of the VM to the client computing device, the operations of the retrieving of the public key, the encrypting of the virtual machine, and the generating of the challenge string being performed in response to the receiving of the notification.

12. The computer-readable storage medium of claim 9, further comprising storing the public key associated with the certificate in a memory after the user is authenticated using the certificate associated with the public key.

* * * * *